United States Patent [19]
Sikkema

[11] Patent Number: 5,010,168
[45] Date of Patent: Apr. 23, 1991

[54] ARAMID POLYMER FROM AROMATIC DICARBOXYLIC ACID MIXTURE AND AROMATIC DIAMINE MIXTURE

[75] Inventor: Doetze J. Sikkema, An Ellecom, Netherlands

[73] Assignee: Akzo nv, Arnhem, Netherlands

[21] Appl. No.: 447,735

[22] Filed: Dec. 8, 1989

Related U.S. Application Data

[62] Division of Ser. No. 245,231, Sep. 16, 1988, Pat. No. 4,908,264.

[30] Foreign Application Priority Data

Sep. 17, 1987 [NL] Netherlands ............... 8702221

[51] Int. Cl.$^5$ ............................................ C08G 69/32
[52] U.S. Cl. ......................................... 528/338; 528/184; 528/194; 528/220; 528/229; 528/337; 528/339; 528/340; 528/348; 528/349

[58] Field of Search .............. 528/338, 339, 340, 348, 528/349, 337, 220, 229, 184, 194

[56] References Cited

U.S. PATENT DOCUMENTS 3,475,387 10/1969 Carter et al. .................... 528/338

Primary Examiner—Harold D. Anderson
Attorney, Agent, or Firm—Richard P. Fennelly; Louis A. Morris

[57] ABSTRACT

Copolyamides are described comprising: (1) 0.22–0.28 mole fraction units derived from terephthalic acid; (2) 0.2–0.28 mole fraction units derived from paraphenylene diamine; (3) 0.22–0.28 mole fraction units derived from isophthalic acid; and (4) 0.22–0.28 mole fraction units derived from a 3,3'- or 4,4'-diamine of diphenyl methane, diphenylpropane-2,2, diphenyl cyclohexane-1,1, diphenyl ether, diphenyl sulfide, diphenyl sulphone, or benzophenone.

15 Claims, No Drawings

ARAMID POLYMER FROM AROMATIC DICARBOXYLIC ACID MIXTURE AND AROMATIC DIAMINE MIXTURE

This is a division of application Ser. No. 245,231, filed Sept. 16, 1988, now U.S. Pat. No. 4,908,264.

The invention relates to composites comprising an aramid matrix and reinforcing fibres embedded therein, to the preparation thereof from suitable semi-manufactured products, and to particular aromatic copolyamides.

It is known to incorporate long fibres, for instance in the form of fabrics, as a reinforcement in a thermoplastic matrix by impregnating the fabrics with a melt of the thermoplastic material. The resulting semimanufacture can be compression moulded into shaped articles but displays the disadvantage of being rigid. Handling and processing thereof give rise to difficulties. It has therefore been proposed before that a flexible structure be prepared from various types of fibres, at least one type of fibre being thermoplastic and the other fibre being maintained as fibre during the melting of the first fibre under the conditions of compression moulding. Such a combination of reinforcing fibres and thermoplastic fibres has the advantage that it forms a flexible semi-manufactured product, so that it can readily be brought into any desired shape. Subsequent use of elevated temperature and pressure will cause the thermoplastic fibres to melt, as a result of which the thermoplastic material will penetrate between the reinforcing fibres and form the matrix in which the reinforcing fibres are embedded in the desired configuration. Instead of fibres, thermoplastic films may be used.

For advanced composites the use is desired of fibres from polymers having a high thermal stability and a high strength. As a suitable polymer may be mentioned, for instance, a wholly aromatic polyamide, and for a reinforcing material the use is known of fibres of polyphenylene terephthalamide. These fibres, however, are not thermoplastic below their decomposition temperature and therefore not suitable for use as matrix material. The older nonprepublished Patent application EP-A-239 159 describes wholly aromatic copolyamides which are built up of at least four different monomers, of which at least one is an aromatic amino carboxylic acid. These copolyamides, however, are difficult to spin into fibres.

The invention has for its object to provide a wholly aromatic copolyamide which displays the chemical and thermal stability inherent in aromatic polyamides and moreover embodies thermoplasticity, ease of spinning and a high heat distortion temperature desirable for a combination of reinforcing fibres and thermoplastic fibres suitable for forming a composite structure.

Accordingly, the invention provides a combination as described in claim 1.

The copolyamides to be used according to the invention as thermoplastic fibres display a glass transition temperature above 200° C., preferably above 250° C., and a correspondingly high heat distortion temperature. The present copolyamides can be spun from the solution in which they are prepared. The present copolyamides are essentially amorphous and can moreover be processed above their glass transition temperature while in the thermoplastic state.

The present copolyamides are built up of at least four different monomers, of which at least two form an aromatic diamine and at least two an aromatic dicarboxylic acid or dicarboxylic acid derivative. The divalent radicals linking the two amino groups or carbonyl groups are aromatic radicals in the sense that the amino nitrogen atoms or the carbonyl carbon atoms are directly linked to an aromatic core. The divalent aromatic radicals are selected from the groups P1, P2, Q1 and Q2.

In the radicals selected from the groups P1 and P2 the two free valencies are in the position para to each other, in the sense that they are oriented parallel to each other or virtually co-axial. The sub-group P1 comprises the radicals 1,4-phenylene, 1,5-naphthalene, 2,6-naphthalene and 4,4'-biphenylene, in which the free valencies are oriented permanently parallel to each other. The sub-group P2 comprises radicals with two aromatic rings linked by the group X, and the free valencies can be positioned parallel to each other by rotation of the aryl-X-bonds.

The monomers which lead to the radicals from the group P1 are: 1,4-diaminobenzene, 1,5-diaminonaphthalene, 2,6-diaminonaphthalene, 4,4'-diaminobiphenyl, 1,4-benzene dicarboxylic acid, 1,5-naphthalene dicarboxylic acid, 2,6-naphthalene dicarboxylic acid and 4,4'-diphenyl dicarboxylic acid and, for the polycondensation, use is generally made of reactive derivatives of the dicarboxylic acids, more particularly dicarbonyl halides. The monomers selected from the group P2 are 3-aminophenyl-4'-aminophenyl alkane-m,m, where the alkane may have 1 to 9 carbon atoms and m represents an integer from 1-9, e.g. 3-aminophenyl-4'-aminophenyl methane, or 3-aminophenyl-4'-aminophenyl propane-2,2, and 3-aminophenyl-4'-aminophenyl-cyclohexane-1,1,3-aminophenyl-4'-aminophenyl ether, 3-aminophenyl-4'-aminophenyl sulphide, 3-aminophenyl-4'-ainophenyl sulphone, and 3,4'-diaminobenzophenone, and the corresponding dicarboxylic acid or dicarbonyl halides or other reactive derivatives.

In the radicals from the groups Q1 and Q2 the two valences are in the position meta to each other, in the sense that they are at an angle to each other of about 120° C., more particularly between 105° C. and 130° C. The sub-group Q1 comprises the radicals 1,3-phenylene, 1,6- and 1,7-naphthalene, 2,7-naphthalene and 2,4-naphthalene, in which the free valencies are oriented rigid relative to each other and the angle between them is approximately 120° C. The sub-group Q2 comprises radicals with two aromatic rings linked together by the group X, and the free valencies are oriented to an angle between them of 90°-130°.

The monomers which lead to the radicals from the group Q1, are: 1,3-diaminobenzene, 1,6-diaminonaphthalene, 2,7-diaminonaphthalene, 3,4'-diaminobiphenyl, 1,3-benzene dicarboxylic acid, 1,6-naphthalene dicarboxylic acid, 2,7-naphthalene dicarboxylic acid and 3,4'-biphenyl dicarboxylic acid, and, for the polycondensation, use is generally made of reactive derivatives of the dicarboxylic acids, more particularly dicarbonyl halides. The monomers from the group Q2 are bis-(3-aminophenyl)alkane-m,m and bis-(4-aminophenyl)alkane-m,m, where the alkane may have 1 to 9 carbon atoms and m represents an integer from 1-9, e.g. bis(3-aminophenyl)methane, bis(4-aminophenyl)methane or bis(4-aminophenyl)propane-2,2, and bis(3- aminophenyl) cyclohexane-1,1, bis(4-aminophenyl)cyclohexane-1,1, bis(3-aminophenyl) ether, bis(4-aminophenyl)ether, bis(3-aminophenyl)sulphide, bis(4-aminophenyl)sulphide, bis(3-aminophenyl)sulphone, 3,3'-diaminobenzophenone and 4,4'-diaminobenzophenone, and the corresponding dicarboxylic acids and dicarbonyl halides or other reactive derivatives.

The groups P1, P2, Q1 and Q2 also include the radicals which per aromatic ring comprise 1 to 4 inert substituents R, where R stands for $C_{1-4}$-alkyl, e.g. methyl, $C_{1-4}$-alkoxy, e.g. methoxy, Cl, F, aryl, ortho-fused benzono or aryl-$C_{1-4}$-alkyl, e.g. benzyl. As examples of such radicals may be mentioned 2-methoxy-1,4-phenylene (P1), 2-methyl-1,4-phenylene (P1), 2-chloro-1,4-phenylene (P1), 1,4-naphthylene (P1), 2,5-diphenylene (P1), 4-methyl-1,3-phenylene (Q1), 5-methyl-1,3-phenylene (Q1), 2,4-diphenylene (Q1), 3,5-diphenylene (Q1), 1,3-naphthylene (Q1), 3,3'-dimethoxybenzophenone4,4'-ylene (Q2), the 4,4'-diradical of 1,2-dinaphthyl ether (P2) and the 4,4'-diradical of 1,1'-dinaphthyl ether (Q2).

For thermoplasticity the present copolyamides comprising at least four monomer units cannot be composed in just any ratio. Based on the total of amide bonds or monomer units the mole fraction for each of the monomer units must not be higher than 0.32. The proportion of radicals from the groups P1 and P2 together must be in the range of 0.18 to 0.82. Likewise, the proportion of radicals from the groups Q1 and Q2 together must be in the range of 0.18 to 0.82, the proportion of radicals from the group Q2 being at least 0.15. In satisfying the requirements for the ratios between the radicals from the groups P1, P2, Q1 and Q2 it does not make any difference whether the radical is from a diamine or from a dicarboxylic acid.

It is preferred that in either case the proportion of radicals from the groups P1 and P2 and Q1 and Q2 should be in the range of 0.36 to 0.74.

It is preferred that the present copolyamide should be built up of exactly four monomers, viz. two dicarboxylic acids and two diamines. Said requirements are met in that case if at least one monomer comprises a radical from the groups P1 and P2, and at least one monomer comprises a radical from the group Q2.

The most suitable are copolyamides built up of predominantly equimolar amounts (0.22–0.28) of 4 monomer units derived from para- or meta-oriented diamines and dicarboxylic acids, with the ratio between the amine groups and the acid groups being of course virtually stoichiometric.

The present copolyamides may be prepared in the usual manner, for instance by melt polymerization, solid phase polymerization, interfacial polymerization or solution polymerization. It is preferred that the polymerization should be carried out in a solvent system which contains at least a solvent of the amide type, such as N-methyl-2-pyrrolidone, N,N-dimethyl acetamide, tetramethyl urea, or a mixture thereof. Optionally, the solvent system may contain a solubility enhancing salt, more particularly an alkali or earth alkali halide, such as lithium chloride or calcium chloride. In solution polymerization the dicarboxylic acids are preferably used in the form of their acid chlorides and added with vigorous stirring to, for instance, a cooled solution of the diamines. The amide solvent also serves as acid acceptor for the hydrogen chloride evolved in the polycondensation.

Depending on the concentration of the polymerizable constituents, the degree of polymerization to be attained, the nature of the solvent, the nature of the monomer units and the final temperature of the polycondensate, generally a solution of the copolyamide will be obtained. If the addition of a solubility enhancing salt is required, then an (earth) alkali hydroxide, (earth) alkali oxide, (earth) alkali carbonate, such as lithium carbonate or calcium hydroxide may be added which acts as an acid acceptor, as a result of which the envisaged lithium chloride or calcium chloride is formed in situ.

The advantage to the present copolyamides is that they are soluble in the polycondensation medium. The resulting solutions can be directly spun by coagulation of the polycondensate solution passing from a spinneret into a spinning bath containing water or a mixture of water and amide solvent. If necessary, the viscosity of the polycondensate solution may be adjusted or the conditions of the polycondensation be set to the optimum value for spinning, preferably without using a solubility enhancing (earth) alkali halide in order to avoid the attendant need for washing it out. Setting the viscosity to the desired value falls within the reach of the person of ordinary skill in the art.

The concentration of polymerizable constituents in the polycondensation mixture is generally in the range of 5 to 25% by weight, the polycondensation being carried out at a temperature in the range of $-20°$ C. to $100°$ C. In this way fibres or films having a thickness between 5 and 200 $\mu$m are obtained.

By fibres according to the invention are also to be understood fibrils obtained by pouring a copolyamide solution into a vigorously stirred coagulation liquid.

The fibres or films from the present aromatic copolyamide along with reinforcing fibres may be formed into a combination according to the invention by any known method. By combination is to be understood here any more or less coherent mixed structure of types of fibres or films, more particularly a flexible textile product which contains a blend of the two types of material and is sufficiently flexible to be rolled up for storage or be formed into the desired final shape. As examples of such structures may be mentioned rovings, fibre tows, yarns, fabrics, nettings, knittings, webs and fleeces of reinforcing fibres and thermoplastic fibres, and laminates of thermoplastic films and fabrics or fleeces of reinforcing fibres. Examples of the combinations referred to above are described in DE-A-34,08 769 and EP-A-156 600.

The reinforcing fibres and the thermoplastic fibres may be blended homogeneously or inhomogeneously to a specific extent in accordance with known technique, after which the blended yarns obtained are formed into some textile structure. Alternatively, the two types of yarns may be separately fed in the process of manufacturing the textile structure, for instance to form the warp and weft in a fabric. For woven fabrics use is preferably made of endless fibres or yarns, whereas staple fibres may be effectively processed into nonwoven fleeces.

The reinforcing fibres to be used for the combination according to the invention are known and commonly used for the reinforcement of plastics, be it that reinforcing materials which melt, soften or decompose below 400° C. are not suitable for this purpose. As examples of suitable reinforcing materials may be mentioned glass fibres, carbon fibres, metallic fibres, ceramic fibres, boron fibres and fibres of some organic polymers displaying high strength and high thermal stability, such as polyaramid and polyimide, viz. polyparaphenylene terephthalate, poly-p-phenylene benzobisoxazole or poly-p-phenylene benzobisthiazole. Alternatively, combinations of reinforcing fibres may be used.

Good results have been obtained with a combination in which use is made of reinforcing fibres coated with a solution of the amorphous copolyamide.

The combination according to the invention serving as semi-manufactured product is generally subjected to compression moulding, which is carried out, if desired, under vacuum or an inert atmosphere. The moulding pressure may be in the range of 0.5 to 1000 bar or higher. The temperature used is between the glass transition temperature of the copolyamide and an upper limit depending on the technology used, which in practice is in the range of 300° C. to 400° C. Or the temperatures and/or pressures may be varied stepwise or in some places a deviating pressure/temperature may be used for special effects.

Textile hose, belts, strips and fibre bundles containing the present copolyamide in combination with reinforcing fibres may be subjected to a continuous compression moulding process, preferably while using some tensile stress. Thus it is possible in a simple manner to manufacture unidirectionally reinforced continuous sections, e.g. round or angular bars, tubes and tapes.

Unidirectionally reinforced tapes of a thickness permitting sufficient flexibility are not only of importance as endproduct having a very high tensile strength in longitudinal direction, but also constitute a suitable semi-manufacture for the manufacture of advanced composite structures. When such tapes are wound under tensile tension and at a melting temperature, the resulting structures may display excellent mechanical properties. Also because of the excellent thermal and chemical resistance of the present copolyamides, these composites compare favourably with the known plastics structures, so that they may find application in fields where metal and ceramic materials have so far been found irreplaceable and advantage may be taken of their considerably lower weight.

The invention will be further described in the following examples.

EXAMPLE I

A. Preparation of copolyamide 90.1 g of paraphenylene diamine (PPD: 0.834 moles) and 165.2 g of bis(4-aminophenyl) methane (MDA; 0.834 moles) were dissolved in 3000 ml of N-methyl-2-pyrrolidone (water content about 0.03%). A mixture of 169.25 g of terephthaloyl dichloride (TDC; 0.834 moles) and 172.70 g of isophthaloyl dichloride (IDC; 98% purity; 0.834 moles) was added with vigorous stirring at a temperature of 22° C. After continued stirring for 1.5 hours a solution of 13.5% by weight of copolyamide PPD/MDA/ TDC/IDC (1:1:1) was obtained. The viscosity of this solution was 280 Pa.s at 25° C. The relative viscosity $n_{rel}$ of the copolyamide was 2,97 (0.5 g in 100 ml of $H_2SO_4$ at 25° C.).

B1. Spinning of filaments

The solution of the copolyamide obtained under A was filtered, degassed and extruded at a nitrogen pressure of 2–4 bar and at a speed of 23.3 m/min through a spinneret having 100 orifices 0.06 mm in diameter each immersed in a water bath of 20° C. The filaments obtained were washed with water of 70° C. and wound at a speed of 7 m/min. The properties of the resulting yarn were as follows:

| | |
|---|---|
| tenacity: | 117 MPa |
| elongation: | 25% |
| modulus of elasticity: | 4.4 GPa |

B2. Spinning of film

A copolyamide solution obtained as described under A was extruded into a water bath of 20° C. through a spinneret having a slit measuring 20 mm×0.1 mm. The outflow opening of the spinneret and the surface of the coagulation bath was separated by an air gap of 20 mm. The coagulate was withdrawn from the water bath at a rate of 4.6 m/min; washed with hot water and wound up. The resulting film had a width of about 8 mm and a thickness of 0.1 mm.

C. Compression moulding

A 10-layer bundle of the film obtained under B2 was placed in a fitting mould measuring 100 mm×50 mm×0.8 mm.

The mould consisted of three layers of aluminium foil 0.8 mm thick, the middle layer having a hole measuring 100×50 mm.

The whole was heated for 1.5 min at a pressure of 10 bar in a press preheated to 350° C. and 380° C., respectively. Subsequently, pressure was applied for 4.5 minutes, followed by cooling for 6 minutes at a pressure of 10 bar. At both pressure temperatures a homogeneous, clear, pale yellow strip 0.8 mm thick was obtained.

Use being made of the same procedure, a combination of a plain fabric of aramid yarn (under the trade mark Twaron) provided on either side with a five-layer bundle of the strip obtained under B2 was subjected to compression moulding, resulting in a void-free composite structure comprising the present amorphous copolyamide as matrix and the aramid fabric as reinforcing structure.

EXAMPLE II

Use being made of the same procedure as given in Example I, a copolyamide was prepared from 25.00 moles of paraphenylene diamine
25.00 moles of bis(4-aminophenyl)methane
25.05 moles of terephthaloyl dichloride and
25.05 moles of isophthaloyl dichloride.

The polymerization was carried out in N-methyl-2-pyrrolidone at a monomer concentration of 16.6% by weight. Upon conclusion of the reaction a polymer solution was obtained having a polymer concentration of 12,4% by weight. Through this solution there was passed a polyparaphenylene terephthalamide yarn having a linear density of dtex 1759. The yarn had the following properties:

| | |
|---|---|
| tenacity: | 1924 mN/tex |
| elongation at rupture: | 3.47% |
| modulus: | 69.6 GPa |

This polyaramid yarn was passed through a bath containing the above polymer solution at a rate of 5 m/minute, and subsequently through a hot water bath for further coagulation of the solution applied to it and removal of the solvent. After having been afterwashed for 16 hours, the yarns were dried to the air.

The resulting polyaramid yarn coated with amorphous polyaramid was blended with copolyamide filaments of Example I B1 until a volume ratio between polyparaphenylene terephthalamide yarn and copolyaramid of 1:1 was obtained. The composition thus obtained was heated to 380° C. in a mould 10 mm wide and 2.50 mm thick and subsequently compression moulded at said temperature and at a pressure of 10 bar into a void-free structure. After the resulting composite had been cooled to room temperature, it was subjected to a measurement with Instron 1026 tensile tester at a temperature of 21° C. and at a rate of 2.0 mm per minute, by which it was found to have the following properties:

| | |
|---|---|
| flexural modulus: | 30847 MPa |
| flexural stress 1.5 h: | 488.4 MPa |
| flexural stress at max. load: | 491.3 MPa |
| elongation at rupture | 3.7% |
| offset yield 0.1% | 331.4 MPa at an elongation of 1.2% |
| offset yield 1.0% | 474.7 MPa at an elongation of 2.6% |

I claim:

1. A copolyamide, which expressed as the mole fraction of the total of amide bonds, comprises: (1) 0.22–0.28 units derived from terephatalic acid; (2) 0.22–0.28 units derived from paraphenylene diamine; (3) 0.22–0.28 units derived from isophthalic acid; and (4) 0.22–0.28 units derived from a 3,3'- or a 4,4'-diamine of diphenyl methane, diphenylpropane-2,2, diphenyl cyclohexane-1,1, diphenyl ether, diphenyl sulfide, diphenyl sulphone, or benzophenone.

2. A copolyamide as claimed in claim 1 wherein the last recited unit is derived from a 3,3'-diamine of diphenyl methane.

3. A copolyamide as claimed in claim 1 wherein the last recited unit is derived from a 4,4'-diamine of diphenyl methane.

4. A copolyamide as claimed in claim 1 wherein the last recited unit is derived from a 3,3'-diamine of diphenylpropane-2,2.

5. A copolyamide as claimed in claim 1 wherein the last recited unit is derived from a 4,4'-diamine of diphenylpropane-2,2.

6. A copolyamide as claimed in claim 1 wherein the last recited unit is derived from a 3,3'-diamine of diphenyl cyclohexane-1,1.

7. A copolyamide as claimed in claim 1 wherein the last recited unit is derived from a 4,4'-diamine of diphenyl cyclohexane-1,1.

8. A copolyamide as claimed in claim 1 wherein the last recited unit is derived from a 3,3'-diamine of diphenyl ether.

9. A copolyamide as claimed in claim 1 wherein the last recited unit is derived from a 4,4'-diamine of diphenyl ether.

10. A copolyamide as claimed in claim 1 wherein the last recited unit is derived from a 3,3'-diamine of diphenyl sulphide.

11. A copolyamide as claimed in claim 1 wherein the last recited unit is derived from a 4,4'-diamine of diphenyl sulphide.

12. A copolyamide as claimed in claim 1 wherein the last recited unit is derived from a 3,3'-diamine of diphenyl sulfone.

13. A copolyamide as claimed in claim 1 wherein the last recited unit is derived from a 4,4'-diamine of diphenyl sulfone.

14. A copolyamide as claimed in claim 1 wherein the last recited unit is derived from a 3,3'-diamine of diphenyl benzophenone.

15. A copolyamide as claimed in claim 1 wherein the last recited unit is derived from a 4,4'-diamine of diphenyl benzophenone.